Oct. 5, 1965  W. W. BILLINGS  3,210,556
AUTOMATIC PARALLELING SYSTEM
Filed Aug. 9, 1962  2 Sheets-Sheet 1

WITNESSES

INVENTOR
William W. Billings
BY
ATTORNEY

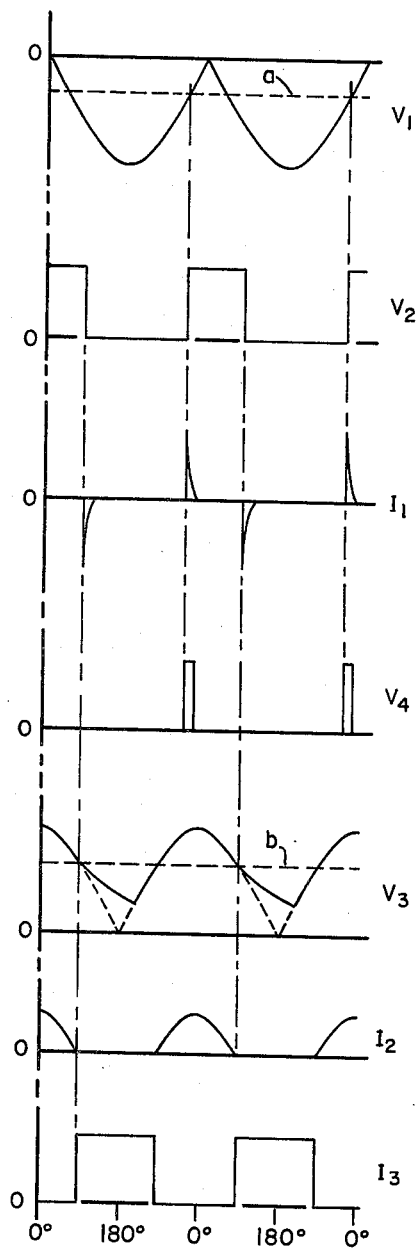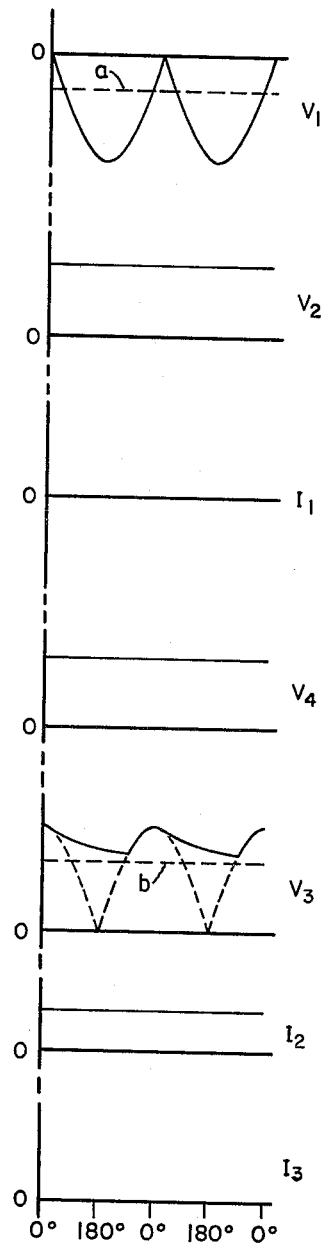
Fig. 3
Fig. 4

United States Patent Office 3,210,556
Patented Oct. 5, 1965

3,210,556
AUTOMATIC PARALLELING SYSTEM
William W. Billings, Lima, Ohio, assignor to Westinghouse Electric Corporation, East Pittsburgh, Pa., a corporation of Pennsylvania
Filed Aug. 9, 1962, Ser. No. 215,855
5 Claims. (Cl. 307—87)

The present invention relates to automatic paralleling of alternating current generators, and more particularly to an improved system for controlling the connection of an alternating current generator to an energized line or bus for operation in parallel with one or more other generators.

When an alternating current generator is to be operated in parallel with one or more other generators, the generators must be close to synchronism with each other when they are connected together, or when the incoming generator is connected to a line or bus to which the other generators are already connected. This means that the voltage, frequency and phase angle of the incoming generator and of the line must be close to the same values, within predetermined limits, in order to prevent excessive system transients, and so that the incoming generator will pull into synchronism with the line and operate properly in parallel with the other generators.

When the generators are provided with control means or regulators which hold the frequency and voltage of the generators close to the desired values, paralleling can be accomplished by providing sensing means for sensing the frequency and phase angle differences between the generator and the line. The output of the sensing means then controls the circuit breaker of the incoming generator to cause the breaker to close at the correct instant when the incoming generator is sufficiently close to synchronism with the line.

Static sensing means are preferably used for this purpose in applications such as in aircraft electrical systems, because of their high reliability under adverse environmental conditions and because they can be made quite small and light in weight. Automatic paralleling systems with static sensing means for controlling the generator breakers have been successfully used, and systems of this kind are disclosed and claimed in a patent of H. H. C. Richards, Jr., et al., No. 2,862,111, and a copending application of O. L. Apfelbeck et al., Serial No. 8,041, filed February 11, 1960, now Patent No. 3,069,556, issued December 18, 1962. In automatic paralleling systems of this general type, a sensing transformer is connected to corresponding phases of the incoming generator and of the line, and the secondary voltage of the transformer is rectified and filtered to provide a pulsating signal voltage. This voltage has its maximum values when the generator and line are 180° out of phase and its minimum values when the generator and the line are exactly in phase, and pulsates at a frequency equal to the frequency difference, or slip frequency, between the generator and the line. This pulsating signal voltage is therefore representative of the phase angle difference and the slip frequency between the generator and the line, and it is used to actuate static control devices to provide an output voltage pulse when the incoming generator and the line are within the predetermined limits of phase and frequency difference. This output voltage pulse is then used to effect closing of the generator circuit breaker.

This type of automatic paralleling system has heretofore required relatively complicated circuitry, and has involved an appreciable time delay between the initiation of the paralleling operation and the actual closing of the breaker. The length of the output pulse in prior systems of this type has also been quite critical, since it must be long enough to ensure closing of the breaker and yet must be terminated at the proper time to prevent possible closing of the breaker after the generator and line have passed through synchronism and have pulled too far apart for successful paralleling. Thus, while prior automatic paralleling systems of this type have been successfully used, they involve certain undesirable problems and relatively complicated circuits.

The principal object of the present invention is to provide an automatic paralleling system of the general type described above in which the problems mentioned are substantially eliminated, and which utilizes a relatively simple circuit so that a high degree of reliability is obtained and the system can be made relatively small and compact.

Another object of the invention is to provide an automatic paralleling system in which the closing of the generator circuit breaker is effected by a very sharp, narrow pulse, so that the characteristics and length of the output voltage pulse are not critical, and in which the time delay in closing the generator breaker after initiation of the paralleling operation is essentially only that inherent in the mechanical movement of the circuit breaker itself.

A further object of the invention is to provide an automatic paralleling system in which the output pulse which effects closing of the generator breaker always occurs at a precisely set phase angle before the phase angle between the generator and line passes through zero, so that improved breaker closing times are attainable and correct paralleling is always assured in a relatively simple and reliable manner.

More specifically, an automatic paralleling system is provided in which the phase angle difference and the slip frequency between the generator and the line are separately sensed. The phase angle sensing means provides a narrow output pulse or signal which is used to turn on a controlled rectifier, or equivalent semiconductor switching device, which effects closing of the generator circuit breaker, while the slip frequency sensing means prevents application of the output pulse to the controlled rectifier if the slip frequency is too great, thus preventing closing of the breaker. In this way a simple and highly reliable static automatic paralleling system is provided.

The invention will be more fully understood from the following detailed description, taken in connection with the accompanying drawing, in which:

FIGS. 3 and 4 are diagrams showing certain voltages and currents at various points in the circuit of FIG. 2 at low slip frequency and at high slip frequency, respectively.

Figure 1:
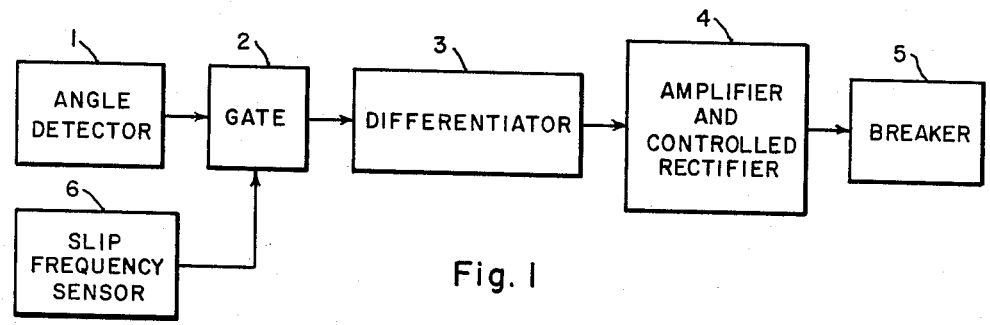
FIGURE 1 is a block diagram illustrating the general operation of the system.

The general operation of the automatic paralleling system is illustrated in FIG. 1. As there shown, a phase angle detector means 1 is provided which has an output signal which changes its value abruptly when the phase angle between the generator and the line comes within a predetermined value. This signal is utilized to turn on a gate circuit 2, causing an abrupt output signal. The gate circuit output signal is differentiated by a suitable differentiating circuit 3 to provide a sharp output pulse when the phase angle difference passes through the predetermined value. This pulse is amplified by an amplifier 4 and applied to a controlled rectifier or other static switching device which controls the generator breaker 5 and causes the breaker to close. A slip frequency sensing means 6 is also provided which supplies an output signal only when the slip frequency is within a predetermined limit. This signal is applied to the gate 2 to control its operation and inhibits the signal to the controlled rectifier if the slip frequency is greater than the predetermined limit, preventing operation of the breaker under these conditons. A relatively simple automatic paralleling system is thus provided which uses completely static components and provides reliable and accurate control of the generator breaker.

Figure 2:
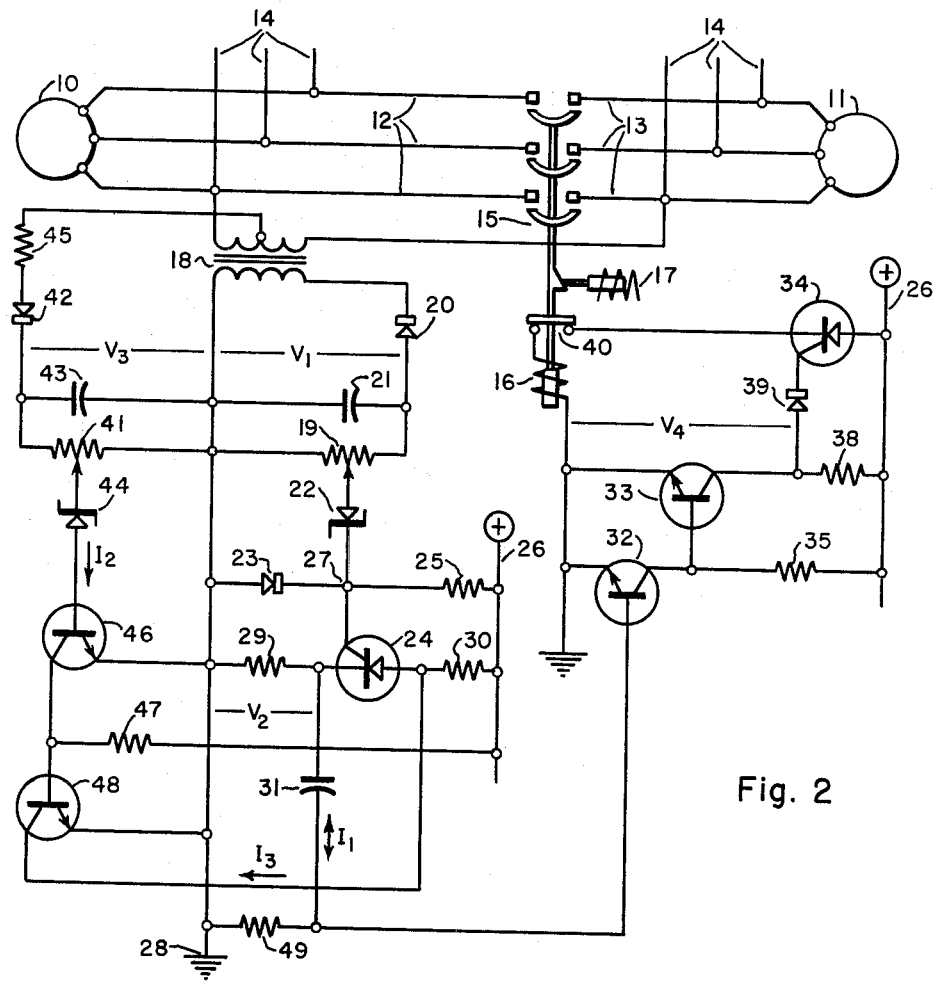
FIG. 2 is a circuit diagram showing a preferred embodiment of the invention.

A preferred embodiment of the invention is illustrated in detail in FIG. 2 in a system for controlling the paralleling of two alternating current generators 10 and 11. The generators 10 and 11 may be any desired type of alternating current generators, and are shown as three-phase generators connected to three-phase lines or buses 12 and 13, respectively, for supplying load buses 14. The generators are connected together for parallel operation by means of a circuit breaker 15 which connects the busses 12 and 13 together. The circuit breaker 15 may be any suitable type of breaker and is shown as having a closing coil 16 which is controlled automatically, as hereinafter described, and which may also be provided with any desired additional means for automatic or manual operation. The breaker 15 also has a trip coil 17 which may be controlled manually or automatically in any desired manner.

It will be understood that, as is usual in systems of this kind, the generators 10 and 11 are provided with voltage regulators (not shown) of any suitable or usual type which maintain the generator voltages sufficiently close to a desired value to permit paralleling. The system thus far described is to be taken as representing any system in which an alternating current generator is to be connected for operation in parallel with one or more other generators, and the circuit breaker 15 represents any suitable switching means for connecting an incoming generator to an already energized line or generator.

As previously discussed, the circuit breaker 15 must be controlled so that it closes only when the incoming generator is close enough to synchronism with the line to permit paralleling. The breaker, therefore, must be controlled so that it can close only when the frequencies and phase angles of the incoming generator and of the line are close enough to enable the generator to pull into synchronism without excessive system transients.

For this purpose, there is provided a sensing transformer 18 which has its primary winding connected to corresponding phase voltages of the generators 10 and 11 so that these voltages subtract vectorially in the transformer winding. The secondary voltage of the transformer 18, therefore, has a maximum value when the voltages of the generator and of the line are 180° out of phase and a minimum value aproaching zero when they are exactly in phase. The output voltage of the transformer 18 is thus a pulsating alternating voltage which pulsates at a frequency equal to the frequency difference, or slip frequency, between the generator and the line and which has a magnitude varying with the phase difference between the generator and the line and approaching zero when the phase differenece is zero. This pulsating output voltage of the sensing transformer 18 is thus representative of the phase angle difference and the slip frequency between the generator and the line, and it is used to provide the input to the phase angle detecting means.

The phase angle detecting means includes a potentiometer 19 which is connected across the output voltage of the transformer 18 in series with a half-wave rectifier 20. A filter capacitor 21 is connected across the potentiometer 19 as shown. The voltage $V_1$ across the potentiometer 19 is thus a rectified and filtered voltage which represents the envelope of the transformer output voltage. The voltage $V_1$ pulsates at a frequency equal to the slip frequency between the generator and the line, with a maximum value when the generator and line are 180° out of phase and a minimum value when they are exactly in phase, as shown in FIGS. 3 and 4 in which the various voltages and currents are plotted against the phase angle difference between the generator and the line.

A predetermined adjustable part of the voltage across the potentiometer 19 is applied to a Zener diode 22 through a blocking rectifier 23. A static switch device 24, which may be a controlled rectifier or other suitable type of semiconductor switching device, has its gate electrode connected through a current limiting resistor 25 to a suitable direct current source indicated at 26. The gate of the switch device 24 is also connected at 27 to the junction between the diode 23 and the Zener diode 22, the blocking diode 23 preventing current flow from the direct current source directly to ground 28. The cathode terminal of the switch device 24 is connected to ground 28, through a resistor 29, and the anode terminal is connected to the direct current supply 26 through a resistor 30.

When the voltage $V_1$ applied to the Zener diode 22 is below the breakdown voltage of the diode, current will flow to the gate of the switch device 24 from the direct current source 26, making it conductive so that the voltage $V_2$ at the cathode is positive. When the voltage $V_1$ of the potentiometer 19 exceeds the breakdown voltage of the Zener diode 22, the diode becomes conductive and the point 27 has negative potential with respect to ground. The gate of the switch device 24 is thus clamped negative with respect to the cathode, so that the switch device can be made non-conductive or turned off by reducing the current to the anode terminal to zero. This may be done by means of a clamping current $I_3$ which is controlled by the slip frequency sensing means in a manner to be described hereinafter. Thus the voltage $V_2$ rises abruptly to a positive value when the Zener diode 22 becomes non-conductive and drops abruptly to zero when the current to the anode is interrupted, as shown in FIGS. 3 and 4. The breakdown voltage of the diode 22 is indicated at $a$ in FIGS. 3 and 4, and it will be seen that when the voltage $V_1$ falls below this value, indicating that the phase difference between the generators 10 and 11 is within the predetermined limits, the voltage $V_2$ rises abruptly to a positive value. The desired phase angle difference for paralleling is easily adjusted by means of the potentiometer 19 which changes the voltage $V_1$ applied to the Zener diode and thus changes the time at which the diode becomes conductive.

The abrupt change of the voltage $V_2$ when the voltage $V_1$ falls below the breakdown voltage $a$ is used to initiate the pulse which effects closing of the circuit breaker 15. For this purpose, a capacitor 31 is connected to the cathode of switch device 24, and the other side of the capacitor is connected to the base of a transistor 32. The capacitor 31 is of relatively small value so that the $V_2$ waveform is not passed through it, but a pulse of current $I_1$ occurs at the beginning and end of the positive voltage notch signal equal to the rate of change of the voltage $V_2$. Since the voltage $V_2$ changes abruptly from zero to a positive value and then back to zero, the rate of change is very high and a very sharp pulse of current $I_1$ occurs at the beginning and end of the notch signal is illustrated in FIG. 3. When the voltage $V_2$ rises, a sharp positive current pulse $I_1$ occurs which is applied as base current to transistor 32.

The collector of transistor 32 is connected to the direct current source 26 through a resistor 35 and to the base of a transistor 33. The collector of transistor 33 is also connected to the direct current supply 26 through a current limiting resistor 38, The emitters of transistors 32 and 33 are connected to ground. The transistor 32 is normamlly non-conductive and its collector voltage is applied to the base of transistor 33. The transistor 33 therefore is normally conductive and the voltage $V_4$ at its collector is substantially zero. When the current pulse $I_1$ is applied to the base of transistor 32, it is momentarily made conductive and its collector voltage falls to zero, so that the transistor 33 is momentarily made non-conductive and a positive voltage pulse $V_4$ appears at its collector.

The voltage pulse $V_4$ is used to control the closing of the circuit breaker 15. For this purpose, a controlled rectifier 34 is preferably utilized. This device may be a controlled rectifier or it may be any other type of solid state switching device having similar characteristics. The controlled rectifier 34 is normally non-conductive but it can be turned on and made conductive by the application of a voltage to the gate electrode. This voltage may be a very brief pulse and after the device has been turned on, it remains conductive until the voltage across it is reduced to substantially zero. Thus the narrow voltage pulse $V_4$ can be utilized to turn on the controlled rectifier 34.

The collector of transistor 33 is connected to the gate electrode of the controlled rectifier 34 through a blocking diode 39. The controlled rectifier may be connected between the direct current supply 26 and the closing coil 16 of the breaker 15 through an auxiliary contact 40, the other end of the closing coil 16 being connected to ground. Thus when the voltage pulse $V_4$ is applied to the gate of the controlled rectifier 34, the closing coil 16 of the breaker is energized from the direct current supply and the breaker closes, the voltage across the controlled rectifier 34 being reduced to zero to turn it off when the auxiliary contact 40 opens upon closure of the breaker. It will be understood that the controlled rectifier 34 might be connected in any desired manner to effect energization of the closing coil 16 when the controlled rectifier is turned on by application of the voltage pulse $V_4$ to its gate electrode.

A slip frequency sensing means is utilized to prevent operation of the circuit breaker 15 if the slip frequently between the incoming generator and the line is too great. The slip frequency sensing means includes a potentiometer 41 connected to a center tap in the primary winding of the sensing transformer 18 through a resistor 45 and rectifier 42. A filter capacitor 43 is connected across the potentiometer 41. The voltage $V_3$ across the potentiometer 41 represents the envelope of a pulsating voltage and is similar to the voltage $V_1$ but has positive polarity and has its maximum when the phase angle between the generators is zero, as shown in FIGS. 3 and 4. The filter capacitor 43 is made of suitable value so that the time constant of the RC circuit consisting of the capacitor 43, resistor 45 and potentiometer 41 is relatively long. The voltage $V_3$ therefore is not the exact envelope of the transformer center tap voltage but is somewhat smoothed out as shown in FIGS. 3 and 4.

A predetermined adjustable part of the voltage of the potentiometer 41 is applied to a Zener diode 44 which is connected to the base of a transistor 46. Thus, when the voltage $V_3$ is below the breakdown voltage $b$ of the Zener diode 44, no base current flows to transistor 46, but when the voltage $V_3$ rises above the breakdown value $b$, the base current $I_2$ flows to transistor 46. The collector of transistor 46 is connected through a resistor 47 to the direct current supply 26 and to the base of a transistor 48. The emitters of transistors 46 and 48 are connected to ground 28. The collector of transistor 48 is connected to the anode of the switch device 24 through a current limiting resistor 49.

When the slip frequency between the incoming generator and the line is low enough to be within the desired limit for paralleling, the voltage $V_3$ is as shown in FIG. 3. The voltage $V_3$ has its maximum values when the phase difference between the generator and the line is zero, and falls below the breakdown voltage $b$ of the Zener diode 44 for a short interval of time in each cycle of the slip frequency. Thus, the transistor 46 is non-conductive during these intervals and base current flows to transistor 48 making it conductive. Collector current $I_3$ therefore flows to transistor 48, clamping out the anode current of switch device 24 and turning it off. Under these conditions, the current pulse $I_1$ will occur as previously described and effect closing of the breaker 15.

If the slip frequency is higher, however, and above the desired limit for paralleling, the voltage $V_3$ is as shown in FIG. 4 and does not fall below the Zener diode breakdown voltage $b$. Thus the Zener diode 44 remains conductive and base current $I_2$ continues to flow to transistor 46 which continues to conduct. This prevents flow of base current to transistor 48 and it remains non-conducting. No current $I_3$ can flow and switch device 24 cannot be turned off. The voltage $V_2$ therefore remains constant and no current pulses $I_1$ can occur.

The operation of this automatic paralleling system will be apparent from the foregoing desrciption. The phase angle detecting means, as previously described, provides an output voltage signal $V_2$ which rises abruptly when the phase angle difference comes within the allowable limits, as set by the potentiometer 19. The output voltage signal $V_2$ is, in effect differentiated by the capacitor 31, giving a sharp positive current pulse $I_1$ when the voltage $V_2$ goes positive. This current pulse $I_1$ is then utilized to momentarily make transistor 32 conductive and transistor 33 non-conductive, producing the voltage pulse $V_4$, the transistors 32 and 33 serving as a pulse amplifier. The voltage pulse $V_4$ is used to turn on the controlled rectifier 34 to effect closing of the circuit breaker 15. However, if the slip frequency is greater than the allowable limit, the current $I_2$ will be flowing and will maintain base current to the transistor 46, thus keeping it conductive and transistor 48 non-conductive. Since the clamping current $I_3$ cannot flow, the switch device 24 cannot turn off and $V_2$ remains at a constant positive value. No current pulses $I_1$ can then occur and no voltage pulses $V_4$ occur. Thus the effect of the frequency sensing means is to inhibit operation of the pulse amplifier transistors 32 and 33 to provide an output voltage and it prevents closing of the breaker if the slip frequency is too great.

It should now be apparent that an automatic paralleling system has been provided which has many advantages. The system is completely static and utilizes a relatively simple circuit with a minimum number of components. Thus a high degree of reliability is obtainable, and a small and compact system of light weight is obtained which is very suitable for such applications as aircraft use. The limits of phase angle difference and of slip frequency are readily adjustable by means of the potentiometers 19 and 41, and the action of the system is positive and reliable. The paralleling pulse which initiates closing of the circuit breaker always occurs at a precisely determined phase angle set by the potentiometer 19, before the phase angle difference reaches zero, so that the breaker has ample time to close before the generator and line have passed through synchronism and pulled too far apart. This operation can be made very precise because of the narrow, sharply defined voltage pulse which is used to turn on the controlled rectifier. There is no problem of critical duration of the output voltage pulse, as in prior systems, since the controlled rectifier will continue to conduct once it is turned on and the operation of the breaker is initiated at a time such that it will reliably close while the phase angle difference is still within the predetermined limits. The operation of the system is thus rapid and accurately controlled and the only time delay in the system is that inherent in the mechanical operation of the circuit breaker itself. Thus, very desirable breaker closing times are obtainable.

A preferred embodiment of the invention has been shown and described for the purpose of illustration. It will be apparent, however, that the invention is capable of various other embodiments and modifications, and it is to be understood that the invention in its broadest aspects is not restricted to the specific details and circuit

I claim as my invention:

1. A system for effecting paralleling of an alternating current generator with an energized line, said system including means for sensing the phase difference between the generator and the line, said phase difference sensing means providing a signal voltage which changes abruptly when the phase difference comes within predetermined limits, means for producing a current pulse in response to abrupt change of said signal voltage, control means operative upon occurrence of said current pulse to effect connection of the generator to the line, means for sensing the frequency difference between the generator and the line, said frequency difference sensing means providing a signal current when the frequency difference is less than a predetermined amount, and means for preventing occurrence of said current pulse in the absence of said signal current.

2. A system for effecting paralleling of an alternating current generator with an energized line, said system including means for sensing the phase difference between the generator and the line, said phase difference sensing means providing a signal voltage which changes abruptly when the phase difference comes within predetermined limits, means for producing a current pulse in response to abrupt change of said signal voltage, control means for controlling connection of the generator to the line, means for applying said current pulse to the control means to effect connection of the generator to the line, means for sensing the frequency difference between the generator and the line, said frequency difference sensing means providing a signal when the frequency difference is less than a predetermined amount, and means for preventing said abrupt change in the signal voltage of the phase difference sensing means in the absence of a signal from the frequency difference sensing means.

3. A system for effecting paralleling of an alternating current generator with an energized line, said system including a semiconductor switching device for effecting connection of the generator to the line upon actuation of the switching device, control means for effecting actuation of said switching device by application of a voltage pulse thereto, means for sensing the phase difference between the generator and the line, said phase difference sensing means providing a signal voltage which changes abruptly when the phase difference comes within predetermined limits, means for producing a current pulse in response to abrupt change of said signal voltage, means for applying said current pulse to the control means to effect operation of the control means to apply a voltage pulse to said switching device, means for sensing the frequency difference between the generator and the line, and means controlled by the frequency difference sensing means for preventing the occurrence of said current pulse when the frequency difference is greater than a predetermined limit.

4. A system for effecting paralleling of an alternating current generator with an energized line, said system including a semiconductor switching device for effecting connection of the generator to the line upon actuation of the switching device, control means for effecting actuation of said switching device by application of a voltage pulse thereto, means for sensing the phase difference between the generator and the line, said phase difference sensing means providing a signal voltage which changes abruptly when the phase difference comes within predetermined limits, means for producing a current pulse in response to abrupt change of said signal voltage, means for applying said current pulse to the control means to effect operation of the control means to apply a voltage pulse to said switching device, means for sensing the frequency difference between the generator and the line, said frequency difference sensing means providing a signal when the frequency difference is less than a predetermined amount, and means for preventing the occurrence of said current pulse in the absence of said signal from the frequency difference sensing means.

5. A system for effecting paralleling of an alternating current generator with an energized line, said system including a semiconductor switching device for effecting connection of the generator to the line upon actuation of the switching device, control means for effecting actuation of said switching device by application of a voltage pulse thereto, means for sensing the phase difference between the generator and the line, said phase difference sensing means providing a signal voltage which changes abruptly when the phase difference comes within predetermined limits, means for producing a current pulse in response to abrupt change of said signal voltage, means for applying said current pulse to the control means to effect operation of the control means to apply a voltage pulse to said switching device, means for sensing the frequency difference between the generator and the line, said frequency difference sensing means providing a signal current when the frequency difference is less than a predetermined amount, and means for preventing change of the signal voltage from the phase difference sensing means in the absence of the signal current from the frequency difference sensing means.

References Cited by the Examiner

UNITED STATES PATENTS

| | | | |
|---|---|---|---|
| 2,817,023 | 12/57 | Rice | 307—87 |
| 2,862,111 | 11/58 | Richards | 307—87 |
| 3,069,555 | 12/62 | Kessler | 307—87 |
| 3,069,556 | 12/62 | Apfelbeck et al. | 307—87 |

LLOYD McCOLLUM, *Primary Examiner.*